UNITED STATES PATENT OFFICE

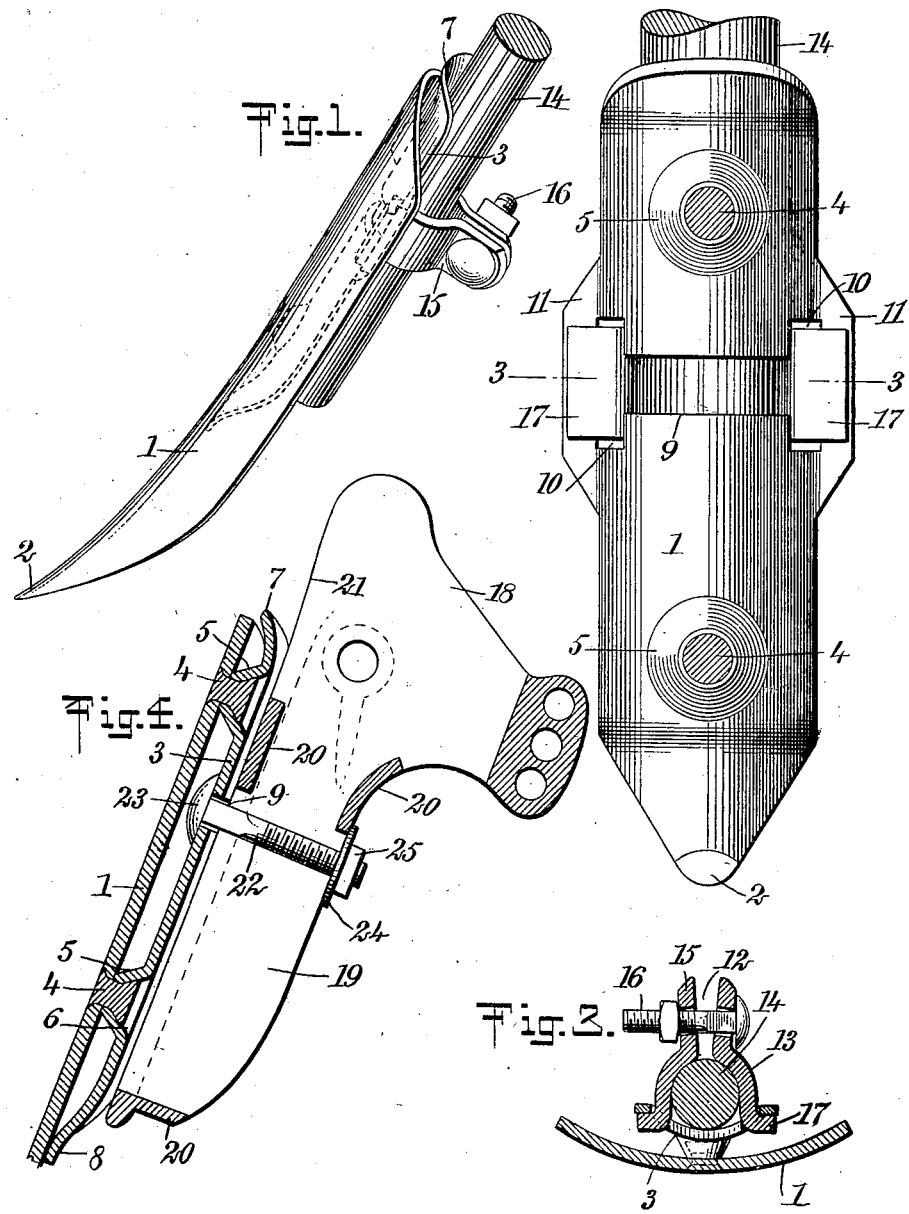

OSCAR GOTTLIEB BANTLEY, OF LEBANON, MISSOURI.

CULTIVATOR-HOE.

No. 890,551.

Specification of Letters Patent.

Patented June 9, 1908.

Application filed April 17, 1906. Serial No. 312,147.

*To all whom it may concern:*

Be it known that I, OSCAR GOTTLIEB BANTLEY, a citizen of the United States, and a resident of Lebanon, in the county of Laclede and State of Missouri, have invented a new and Improved Cultivator-Hoe, of which the following is a full, clear, and exact description.

This invention relates to cultivator hoes or shovels, and the object of the invention is to produce a hoe or shovel which is so constructed as to be readily attached to hoe bars of different construction.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a perspective showing the lower extremity of a hoe bar of round form, to which the hoe is represented as attached; Fig. 2 is a front view of the saddle-plate and hoe bar shown in Fig. 1, a portion of the hoe being represented as removed; Fig. 3 is a cross section taken on the line 3—3 of Fig. 2; and Fig. 4 is a vertical section taken through a foot of a hoe bar of common construction, and illustrating the manner in which the hoe may be attached in this instance.

Referring more particularly to the parts, 1 represents the body of the hoe or shovel, which consists of an elongated plate slightly curved, and presenting its convex side forwardly, the lower extremity of the plate being tapered and bent forwardly to form a point 2, so that the plate constitutes a shovel or hoe which will till the earth when dragged along in the usual manner. To the side of this body 1, I attach a saddle or saddle plate 3, which plate is curved slightly to conform to the curvature of the body plate 1. It extends longitudinally therewith, and is attached thereto by means of suitable fastening devices such as the rivets 4. This saddle plate 3 is maintained at a slight distance from the body 1 by means of bosses 5 which are formed by striking the material of the saddle plate outwardly, as shown most clearly in Fig. 4. These bosses 5 present the form of cone frustums, so that conical recesses 6 are formed, in which the rivet heads are received. The upper extremity of the saddle plate 3 is extended upwardly and bent slightly outwardly so as to form a lip 7. The lower extremity of the saddle plate is bent downwardly and against the inner face of the body 1 so as to form a guard tongue 8 which prevents the earth from forcing itself way up between the saddle plate and the body. At a suitable point on the saddle plate 3, preferably between the bosses 5, the same is provided with a transverse slot 9, as indicated more clearly in Fig. 2. The extremities of this slot are in communication with slots 10 disposed at the sides and extending longitudinally of the hoe. At these slots 10 the side edges of the saddle plate are extended laterally to form rudimentary flanges 11.

In Figs. 1 to 3 the hoe is represented as attached to a hoe bar of round form. In order to attach the hoe bar, I provide a clamp 12, the said clamp being formed with oppositely disposed sections 13, the bodies whereof are curved slightly to conform to the side of the hoe bar 14. At one side, these sections or clips 13 are formed with outwardly projecting ears 15, through which a clamping bolt 16 passes as indicated. The inner extremities of the clips 13 are bent laterally so as to form dogs 17 which pass through the aforesaid side slots 10. From an inspection of Fig. 3 it will be evident that by tightening the bolt 16 the saddle plate 3 and the clamp 12 will grasp the hoe bar firmly.

In Fig. 4 I represent the hoe as attached to a foot 18 of the hoe bar, which is of common form, presenting oppositely disposed substantially parallel cheek plates 19 connected by webs 20. The hoe seats itself upon the forward inclined edges 21 of the foot, and a bolt 22 is provided, the shank whereof passes through the aforesaid transverse slot 9, the head 23 of the bolt being seated against the inner side of the saddle plate 3, as shown. The threaded shank of the bolt projects beyond the rear edges of the cheek plates 19 and receives a washer 24 which seats against these plates and is secured in position by a nut 25 as shown. Evidently, with this arrangement, the hoe may be securely attached to the foot. In placing the bolt 22 in position, the head 23 thereof is passed through one of the aforesaid side slots 10. The bolt is then moved inwardly until it comes to substantially the central line of the hoe. By reason of the transverse slot 9 the hoes may be attached in intermediate positions, so as to be inclined to the direction in which the machine advances. They may be arranged in this manner in order to throw the dirt toward or away from a row of the crops.

Evidently with a hoe or shovel of the construction described, its attachment may be readily effected to a round hoe bar such as that shown in Figs. 1 to 3, or to a foot of the general type illustrated in Fig. 4.

Having thus described my invention, I claim as new and desire to secure by Letters Patent:

A hoe adapted to be used with different forms of hoe-bars, said hoe having longitudinally disposed side slots and a transverse slot connecting said side slots, said side slots affording means for attaching clamping clips to clamp said hoe to a hoe-bar, said side slots also affording means for inserting the head of a bolt which may pass through said transverse slot to attach said hoe to a hoe-bar.

In testimony whereof I have signed my name to this specification in the presence of two subscribing witnesses.

OSCAR GOTTLIEB BANTLEY.

Witnesses:
E. F. STEBBINS,
M. W. JOHNSON, Jr.